United States Patent [19]
Yamaguchi et al.

[11] Patent Number: 5,762,278
[45] Date of Patent: Jun. 9, 1998

[54] HANDLE FOR FISHING REEL

[75] Inventors: Nobuyuki Yamaguchi; Takeo Miyazaki, both of Tokyo, Japan

[73] Assignee: Daiwa Seiko, Inc., Tokyo, Japan

[21] Appl. No.: 531,968

[22] Filed: Sep. 21, 1995

[30] Foreign Application Priority Data

Sep. 21, 1994 [JP] Japan ................... 6-252813

[51] Int. Cl.$^6$ .................................... A01K 89/00
[52] U.S. Cl. ........................... 242/283; 16/121
[58] Field of Search ............... 16/121, 114 R; 242/283, 284

[56] References Cited

U.S. PATENT DOCUMENTS

| | | | |
|---|---|---|---|
| 2,608,889 | 9/1952 | Krupin | 16/121 |
| 2,978,927 | 4/1961 | Blanton | 16/121 |
| 4,052,768 | 10/1977 | Yamazaki et al. | 16/121 |
| 4,083,264 | 4/1978 | Van Klompenburg | 16/121 |
| 4,356,739 | 11/1982 | Brown et al. | 16/121 |
| 4,791,828 | 12/1988 | Kaye | 16/121 |
| 4,967,445 | 11/1990 | Miller et al. | 16/121 |
| 5,292,087 | 3/1994 | Sato | 242/283 |

FOREIGN PATENT DOCUMENTS

| | | |
|---|---|---|
| 58-96783 | 7/1983 | Japan . |
| 58-117860 | 8/1983 | Japan . |
| 4-100380 | 8/1992 | Japan . |

*Primary Examiner*—Katherine Matecki
*Attorney, Agent, or Firm*—Sughrue, Mion, Zinn, Macpeak & Seas, PLLC

[57] ABSTRACT

A handle piece of a blind-hole construction with a closed axial outer end is fitted on a support shaft, fixedly secured to an end of a handle arm, in an axial direction from an outer end of the support shaft. A handle piece-side retaining portion and a support shaft-side retaining portion, which cooperate with each other to retain the handle piece relative to the support shaft, are provided on the handle piece and the support shaft, respectively. When the handle piece is fitted on the support shaft in the axial direction, the handle piece is retained relative to the support shaft by the two retaining portions, thereby enhancing the mounting operation.

10 Claims, 3 Drawing Sheets

3

HANDLE FOR FISHING REEL

BACKGROUND OF THE INVENTION

This invention relates to an improved handle for a fishing reel.

In a conventional handle rotatably mounted on a reel body so as to be rotated to wind a fishline on a spool, a support shaft, inserted into a tubular portion of a handle piece, is fixedly secured to one end of a handle arm by compressive clamping or the like, so that the handle piece is rotatably supported on the support shaft in a retained manner, as disclosed in Japanese Utility Model Unexamined Publication Nos. 58-96783, 58-117860 and 4-100380.

In the above conventional construction, however, the support shaft, inserted into the handle piece, is fixedly secured to the end of the handle arm by compressive clamping or the like, and therefore the handle mounting operation, including the lubricating operation during the mounting operation, is inefficient.

Furthermore, an insertion hole for inserting the support shaft thereinto opens out to the outer end of the handle piece, and therefore dirt or the like is liable to intrude into the handle piece. Besides a separate member such as a cap is attached and fixed to the handle piece to close the insertion hole, which results in greater time and labor being required during manufacturing.

SUMMARY OF THE INVENTION

It is therefore an object of this invention to provide a fishing reel in which the efficiency of a handle piece-mounting operation is enhanced, and the provision of an opening in an axial outer end of the handle piece is eliminated, thereby eliminating the possibility of intrusion of dirt or the like.

To achieve the above object, according to the invention as defined in claim 1, there is provided a handle for a fishing reel wherein a handle piece is rotatably and retainingly mounted on a support shaft fixedly secured to an end of a handle arm of the handle adapted to be mounted on a drive shaft of a reel body; characterized in that the handle piece is fitted on the support shaft, fixedly secured to the end of the handle arm, in an axial direction from an outer end of said support shaft; and retaining portions for retaining the handle piece relative to the support shaft are provided on the handle piece and the support shaft, respectively.

In the handle for the fishing reel, the support shaft is fixedly secured to the end of the handle arm, and then the handle piece is fitted on the support shaft from the outer end of the support shaft, and the handle piece is rotatably retained against disengagement by the retaining portions provided respectively on the handle piece and the support shaft. Therefore, the efficiency of mounting of the handle piece on the end of the handle arm is enhanced.

In the invention, the handle piece-side retaining portion is formed integrally with the handle piece.

In the handle for the fishing reel, since the handle piece-side retaining portion is formed integrally with the handle piece, the retaining operation by the two retaining portions is effected simultaneously when fitting the handle piece on the support shaft in the axial direction.

Alternately, the handle piece-side retaining portion can be attached to the handle piece from the outside.

In the handle for the fishing reel, the handle piece can be retained by the retaining portion attached thereto from the outside, and therefore the handle piece can be attached to and detached from the support shaft fixedly secured to the handle arm.

In the invention, the handle piece has an axially extending blind-hole formed within it with a closed axial outer end thereby preventing the intrusion of dirt or the like.

DETAILED DESCRIPTION OF THE PREFERRED EMBODIMENTS

A preferred embodiment of the present invention will now be described with reference to the accompanying drawings.

Figure 1:
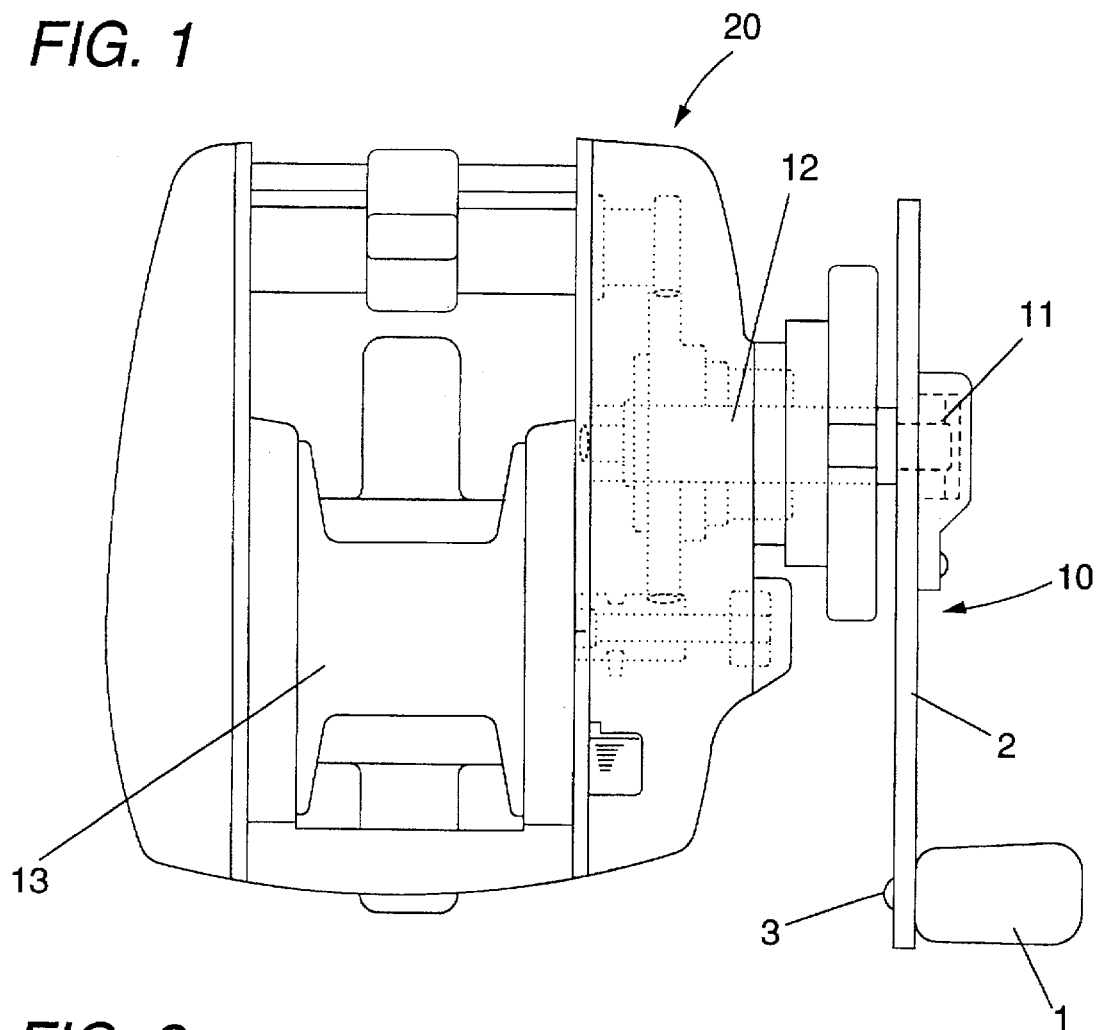
FIG. 1 is a side-elevational view of a fishing reel having a first embodiment of a handle of the invention.
Figure 2:
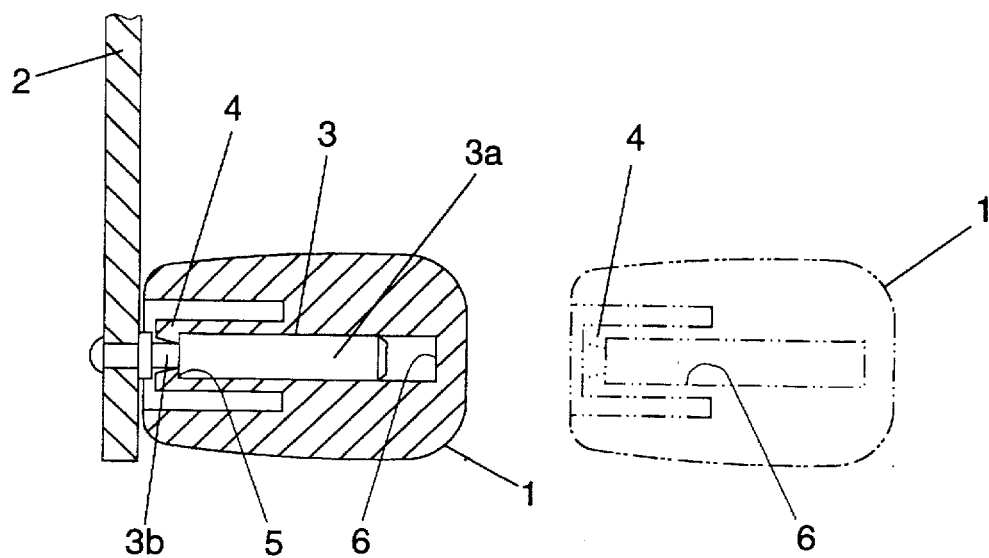
FIG. 2 is a cross-sectional view of a handle piece of the handle of FIG. 1.
Figure 3:
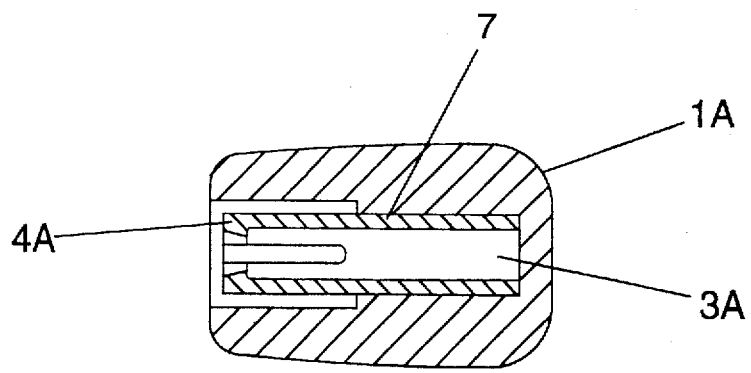
FIG. 3 is a cross-sectional view of a modified form of the handle piece of FIG. 1.

FIGS. 1 to 3 show a first embodiment of a handle of the invention for a fishing reel. FIG. 1 is a side-elevational view of the fishing reel having the first embodiment of the handle. FIG. 2 is a cross-sectional view of a handle piece of the handle of FIG. 1. FIG. 3 is a cross-sectional view of a modified form of the handle piece of FIG. 1.

In FIG. 1, a handle arm 2 of the handle 10 is fixedly mounted on a drive shaft 12 of a reel body 20 by a nut 11. The handle piece 1 is rotatably mounted on a support shaft 3 in a retained manner, the support shaft 3 being fixedly secured to one end of the handle arm 2. The handle 10 is rotated by an anglers hand while holding the handle piece 1, and the rotation of the handle 10 is transmitted to a reel mechanism through the drive shaft 12 so that a fishline can be wound on a spool 13.

FIG. 2 is a cross-sectional view of the handle piece 1. The handle piece 1 has a blind-hole construction with a closed axial outer end as shown in a dots-and-dash line at the right side of FIG. 2. The handle piece 1 has a handle piece-side retaining portion 4, and an insertion hole 6 for receiving the support shaft 3.

The support shaft 3, fixedly secured to the end of the handle arm 2, has a larger-diameter portion 3a inserted into the insertion hole 6 in the handle piece 1, and a smaller diameter portion 3b fixedly secured to the handle arm 2. A support shaft-side retaining portion 5 is formed by a step portion provided between the larger-diameter portion 3a and the smaller-diameter portion 3b.

In the above construction of this embodiment, for mounting the handle piece 1, the support shaft 3 is first fixedly secured to the end of the handle arm 2, and then the insertion hole 6 in the handle piece 1 is fitted on the larger-diameter portion 3a of the support shaft 3 from the axially outer side while expanding the handle piece-side retaining portion 4, so that the handle piece-side retaining portion 4 engages with the support shaft-side retaining portion 5, thereby retaining the handle piece 1 against disengagement, as shown in FIG. 2.

In the mounting of the handle piece 1 of this embodiment, unlike the conventional construction, the handle piece 1 can be retainingly supported on the support shaft 3 merely by fitting the handle piece 1 on the support shaft 3 in the axial direction. Thus, the mounting operation including a lubricating operation can be carried out merely by the single step, that is, the fitting of the handle piece 1, and therefore the efficiency of the assembling operation can be greatly enhanced. And besides, since the handle piece 1 has the closed axial outer end, the intrusion of dirt or the like is prevented.

FIG. 3 is a modified form of the first embodiment. A support tube 7 for receiving a support shaft 3A is separately formed from a handle piece 1A, and then fixed thereto. A retaining portion 4A is formed on the support tube 7.

Wish this separate construction, the handle piece 1A is simplified in construction, and in addition to similar effects as described in the first embodiment, advantages are achieved such as increased ease of moldability and an enhanced durability.

A second embodiment of the present invention will now be described.

Figure 4:
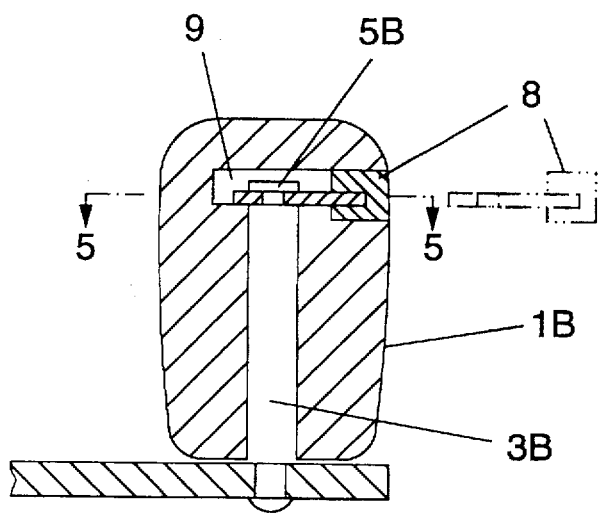
FIG. 4 is a cross-sectional view of a second embodiment of a handle piece of the invention.
Figure 5:
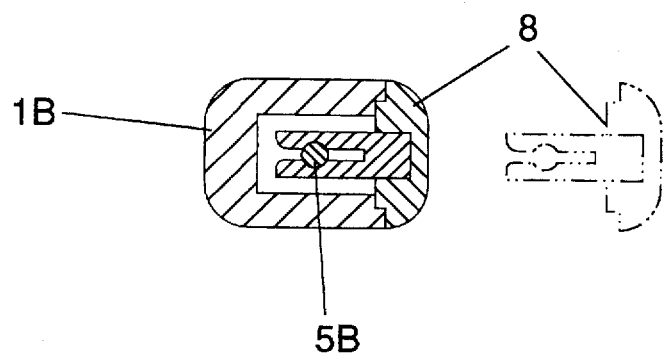
FIG. 5 is a cross-sectional view taken along the line 5—5 of FIG. 4.
Figure 6:
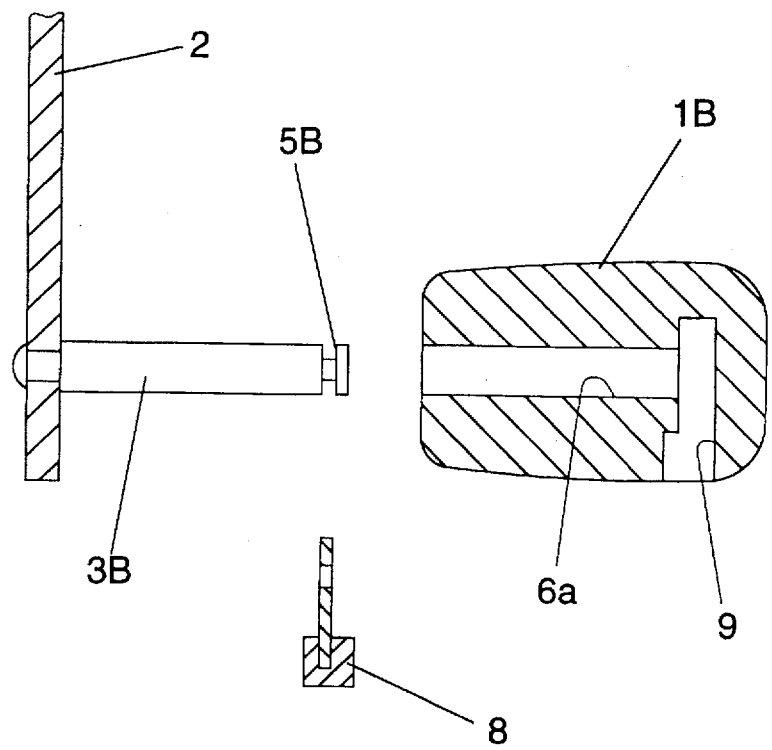
FIG. 6 is an exploded view of the handle piece of FIG. 4, showing the manner of mounting the handle piece.

FIG. 4 is a cross-sectional view of the second embodiment of a handle piece of the invention. FIG. 5 is a cross-sectional view taken along the line 5—5 of FIG. 4. FIG. 6 is an exploded view of the handle piece of FIG. 4.

In the second embodiment of FIG. 4, a retaining portion 8 is inserted laterally from the outside into a mounting hole 9 formed in an outer end portion of the handle piece 1B, thereby retaining the handle piece against disengagement.

In this case, a retaining portion 5B is formed at a distal end of a support shaft 3B as shown in FIG. 6, and the handle piece 1B has the mounting hole 9 formed at its outer end portion for receiving the retaining portion 8 from the outside. The mounting hole 9 extends in a direction orthogonal to a rotation axis of the handle piece 1B.

A bifurcated end portion of the retaining portion 8 can be retainingly fitted on a retaining neck of the retaining portion 5B of the support shaft 3B, as shown in FIG. 5.

In the above construction of the second embodiment, the support shaft 3B is first fixedly secured to the end of the handle arm 2 as shown in FIG. 6. Next, a bore hole to provide an insertion hole 6a for fitting is hollowed out of the handle piece 1B to provide an insertion hole 6a for fitting on the support shaft 3B. Finally, the retaining portion 8 is inserted into the mounting hole 9 from the outside to be retainingly engaged with the retaining portion 5B of the support shaft 3B, as shown in FIGS. 4 and 5.

In this embodiment, since the retaining portion 8 is inserted from the outside to retain the handle piece, there is obtained an advantage that the handle piece 1B can be attached to and detached from the support shaft 3B fixedly secured to the handle arm 2. And besides, since the handle piece 1B has a blind-hole construction with the closed outer end as in the preceding embodiment, the intrusion of dirt or the like can be prevented.

As described above, in the invention, the support shaft is fixedly secured to the handle arm, and then the handle piece is rotatably fitted on the support shaft from the outer end of the support shaft in a retained manner. Therefore, the mounting operation including a lubricating operation is effected only by attaching the handle piece, and the efficiency of the operation is enhanced.

In the invention, in the case were the handle piece is retainingly mounted simply by fitting the handle piece on the support shaft in the axial direction, the efficiency of the operation is further enhanced, and the construction is simplified, which reduces the cost.

In the invention, in the case where the handle piece-side retaining portion is separately formed and then attached to the handle piece from the outside, the handle piece can be attached to and detached from the support shaft fixedly secured to the handle arm, and the handle piece can be easily exchanged, and lubricating the handle after using the fishing reel can be effected easily.

In the invention, in the case where the axial outer end of the handle piece is closed, dirt or the like will not intrude into the handle piece, and an integral, design is obtained.

What is claimed is:

1. A handle for a fishing reel, comprising:
   a handle arm adapted to be mounted on a drive shaft of a reel body;
   a support shaft having inner and outer ends, said inner end being fixedly secured to said handle arm;
   a handle piece having an axially extending hole, said handle piece being rotatably mounted on said support shaft, with said outer end of said support shaft being inserted into said axially extending hole and said inner end of said support shaft being fixedly secured to said handle arm; and
   first and second retaining portions engageable with each other for retaining said handle piece relative to said support shaft, said first and second retaining portions being provided on said handle piece and said support shaft, respectively;
   wherein said axially extending hole is a blind hole, such that said handle piece has a closed, axial outer end;
   wherein said handle niece has a radially extending hole orthogonal to and in communication with said axially extending hole, and said second retaining portion protrudes from said axially extending hole into said radially extending hole and engages with said first retaining portion which is inserted into and fixed to said handle piece through said radially extending hole; and
   wherein said first retaining portion has a bifurcated end portion, and said second retaining portion includes an annular groove circumscribing said support shaft and engageable with said bifurcated end portion.

2. A handle for a fishing reel according to claim 1, wherein said first retaining portion is formed separately from said handle piece and fixedly bonded onto said handle piece.

3. A handle for a fishing reel according to claim 1, wherein said bifurcated end portion of said first retaining portion elastically engages with said annular groove.

4. A handle for a fishing reel according to claim 3, wherein said first and second retaining portions are recessed within said axially extending hole.

5. A handle for a fishing reel according to claim 4, wherein said first and second retaining portions are recessed within said axially extending hole at said outer end of said support shaft.

6. A handle for a fishing reel according to claim 1, wherein said radially extending hole is formed as a blind hole.

7. A handle for a fishing reel according to claim 1, wherein said axially extending blind hole is a bore hole.

8. A handle for a fishing reel according to claim 7, wherein said bore hole has a substantially circular cross-section and said support shaft has an outer contour substantially complementary to the cross-section of said bore hole.

9. A handle for a fishing reel according to claim 1, wherein said first and second retaining portions are recessed within said axially extending hole.

10. A handle for a fishing reel according to claim 9, wherein said first and second retaining portions are recessed within said axially extending hole at said outer end of said support shaft.

* * * * *